United States Patent [19]
Hobbel et al.

[11] Patent Number: 5,366,406
[45] Date of Patent: Nov. 22, 1994

[54] APPARATUS AND METHOD FOR CONVEYING A BIRD ALONG A POULTRY PROCESSING LINE

[75] Inventors: Arend Hobbel; Bastiaan Verrijp, both of Numansdorp, Netherlands

[73] Assignee: Systemate Holland B.V., Numansdorp, Netherlands

[21] Appl. No.: 184,491

[22] Filed: Jan. 18, 1994

[51] Int. Cl.$^5$ .......................... A22C 21/00; B07C 5/20
[52] U.S. Cl. ..................................... 452/179; 452/184
[58] Field of Search ............... 452/179, 127, 184, 157, 452/183, 182; 209/594, 592, 512; 198/680; 177/163

[56] References Cited

U.S. PATENT DOCUMENTS

| | | | |
|---|---|---|---|
| 3,063,383 | 11/1962 | Toennies | 452/183 |
| 3,622,000 | 11/1971 | McClenny | 209/121 |
| 3,686,712 | 8/1972 | Lewis | 452/179 |
| 4,498,578 | 2/1985 | Altenpohl | 452/183 |
| 4,896,399 | 1/1990 | Hazenbroek | 452/157 |
| 5,092,815 | 3/1992 | Polkinghorne | 452/179 |

*Primary Examiner*—Willis Little
*Attorney, Agent, or Firm*—Hopkins & Thomas

[57] ABSTRACT

A grading shackle (10) for suspending birds from the overhead conveyor system of an automated poultry processing plant. The grading shackle (10) has a tiltable support frame (15) and a bird support bracket (20) pivotally attached to the support frame (15). The tiltable support frame (15) has a pair of wheels (40) which carry the support frame along the rails (102) of an automated weigh scale along the poultry processing line, and an elongated pin (52) to which bird support bracket (20) is pivotally attached. As the grading shackle proceeds up the inclined ramps (100) onto the rails (102) of the weigh scale, tiltable support frame (15) pivots away from the direction of travel along the poultry processing line while bird support bracket (20) simultaneously rotates through an arc about vertical axis (63) of the grading shackle (10) so that the wings of the bird (84) suspended from grading shackle (10) will move away from the wings of adjacent birds on adjacent grading shackles in order to accurately determine the weight of the bird (84) carried on grading shackle (10). As grading shackle (10) is conveyed away from the weigh scale, tiltable support frame (15) moves from a generally horizontal position back to a generally vertical position and bird support bracket (20) rotates back into its original position about vertical axis (63).

24 Claims, 3 Drawing Sheets

APPARATUS AND METHOD FOR CONVEYING A BIRD ALONG A POULTRY PROCESSING LINE

FIELD OF THE INVENTION

This invention relates in general to poultry conveying equipment from which birds are suspended by their legs and moved in series on a suspended conveyor system through a plurality of work stations along a poultry processing line. More particularly, this invention relates to a grading shackle which is connected to a suspended conveyor system, and from which birds are suspended.

BACKGROUND OF THE INVENTION

In modern poultry processing plants, chickens, turkeys, and other types of birds raised for commercial slaughter are moved through a poultry processing plant to defeather, eviscerate, cut-up, and package the birds for shipment to wholesale and retail grocers, as well as food service companies and restaurants. It is desirable to perform as many of the processing steps as possible with automated machinery in order to speed the processing of the poultry, and in order to uniformly grade, prepare, and package the poultry for end use. It is extremely important in modern processing plants to determine the weight, or grade, of each bird being processed as accurately and as uniformly as possible for consistent results in processing. Moreover, the weight of each bird needs to be measured accurately in order to send the bird to the proper cut-up line designed and equipped to cut-up birds of that particular size.

Modern poultry processing plants are thus equipped with automated weighing systems for grading the birds by weight. These weighing systems are typically configured as a load bridge or weigh scale forming a pan of the suspended conveyor system which carries birds through the plant. The weight scale may itself be a mechanical, electrical or electromechanical grading and weighing system for determining the size of each bird passing through the poultry processing line.

Moreover, as Americans become more health conscious and are now consuming poultry in greater numbers than before, the demand for uniformly processed poultry is increasing. Thus the need has arisen to move more birds through poultry processing plants. This can be accomplished through either speeding up the processing lines or by spacing the birds closer to one another on the processing line in order to handle more birds per unit of processing time. However with either, or a combination, of these alternatives the problem arises with accurately and uniformly grading the birds so each bird can be sent to the proper cut-up line. The faster the system moves, the less time the system has to weigh the birds. Also, the closer birds are spaced to each other along the poultry processing line, the greater the likelihood that the true weight of a single bird cannot be determined with that degree of uniformity and consistency required in order to efficiently process the bird.

The general trend in the poultry processing industry in recent years has been to suspend birds by their legs from shackles attached to an overhead conveyor system, and perform as many of the processing steps as possible as the birds are being moved in series on the conveyor system from one processing station to the next. Presently, the poultry processing industry suspends the birds by their hocks from grading shackles which are spaced apart from one another on a poultry processing line in which each one of the birds is oriented on the line so that the wing tips of each bird face toward the wing tips of adjacent birds on adjacent shackles. This is the preferred position of the birds on the shackles as they are moved toward and into a processing line. However, in this orientation it is quite likely that the wing tips of the bird to be weighed will be intertiering with the wing tips of adjacent birds, thus impeding the accurate determination of the bird's weight. Moreover, in more modern plants, the birds will be on six inch centers so that only six inches separates one bird from the next. A modern system will also move 180 to 200 birds a minute along the scale line in which the weigh scale is placed.

Therefore, before the birds can be sent to the proper processing or cut-up line, the weight of the bird to be processed must be determined without also weighing birds suspended on adjacent shackles as the birds are being moved through the weigh scale of the poultry processing line. It is desirable from a grading standpoint that a bird be weighed without touching adjacent birds in order to take weight from, or transfer weight to adjacent birds when weighing the bird.

Accordingly, a need exists for an improved grading shackle and method for conveying poultry along the processing line toward and through an automated weighing system so that the weight of each bird is determined uniformly and accurately for the purpose of processing the bird on the cut-up line sized for that bird.

SUMMARY OF THE INVENTION

Briefly, described, the present invention comprises a poultry grading shackle suspended from the overhead conveyor system of a poultry processing line. While the present invention is herein described with reference to the conveying of a bird suspended from a grading shackle through a weighing and grading system of a poultry processing line, it will be understood by those skilled in the an that the present invention can be utilized for handling poultry along any point of a poultry processing line in which conveyor systems carry the birds in an inverted attitude suspended by their legs.

The present invention comprises an articulated and angularly displaceable grading shackle for carrying birds to be weighed as the shackle moves along the overhead conveyor system of a poultry processing line. The grading shackle includes a tiltable support frame for suspension from the overhead conveyor system, the support frame including means for tilting the support frame in response to the movement of the shackle along an inclined portion of the processing line leading toward a weigh scale or load bridge. The grading shackle also includes a bird support bracket suspended from the support frame, and means responsive to the tilting of the support frame for rotating the bird support bracket about a generally upright axis along the center line of the grading shackle and the trolley of the overhead conveyor system to which the grading shackle is attached.

In greater detail, the grading shackle has a pair of parallel spaced apart wheels which are connected to the frame along a common horizontal axis transverse, or perpendicular, to the direction of travel in which the shackle is being moved along the processing line. The wheels carry the grading shackle along a pair of parallel rails supporting the shackle as it travels along the weigh scale or load bridge of a poultry processing line. As the shackle travels up an inclined ramp toward the load bridge, the upper end of the tiltable support frame pivots about its connection to the trolley of the overhead conveyor system, while the support frame tilts away from the shackle's direction of travel. As the support frame tilts away from the direction of travel, an elongated pin mounted in an upright plane in the support frame at an angle to the horizontal axis of the wheels is tilted from its generally upright plane to a generally horizontal position. The bird support bracket is pivotally attached to this pin, and as the pin is tilted with the tilting of the support frame, the bird support bracket rotates about an upright central axis thereby rotating the bird suspended from the grading shackle through the same angle, an angle of between 30 to 60°, so that the wing tips of the bird being weighed will not interfere with the wing tips of adjacent birds to ensure accurate weighing of the bird on the shackle.

The present invention also comprises an improved method for weighing birds on the weigh scale of a poultry processing line. This method includes tilting a support section of the grading shackle from which the bird is suspended in response to moving up an inclined ramp toward the weigh scale of the processing line, while simultaneously rotating the bird support bracket of the shackle about a generally upright axis in response to the tilting of the shackle. After the shackle has traveled across the weigh scale, the support section of the shackle is tilted back to its generally upright attitude as it is conveyed off of the weigh scale, while the bird support bracket simultaneously rotates back into its original position for carrying the bird along the poultry processing line.

Therefore, it is an object of the present invention to provide an improved grading shackle and method for weighing birds being processed on an automated poultry processing line in order to determine the true weight of the bird carried on the shackle.

It is another object of the present invention to provide an improved grading shackle that will tilt and rotate as the grading shackle is being passed over the weigh scale of a poultry processing line.

Another object of the present invention is to provide an apparatus which is simple in design and inexpensive to construct, is durable and rugged in structure, and can be easily tit or retrofit to new or existing poultry processing operations using overhead conveying systems from which the birds to be processed are suspended.

Still another object of the present invention is to provide an improved method for weighing birds being processed in a poultry line so that the bird can be quickly and efficiently weighed to accurately grade and sort the bird for processing.

These and other objects, features, and advantages of the invention will become apparent upon reading the specification when taken into conjunction with the accompanying drawings, wherein like characters of reference designate corresponding parts throughout several views.

DETAILED DESCRIPTION OF THE PREFERRED EMBODIMENT

Figures 1, 2:
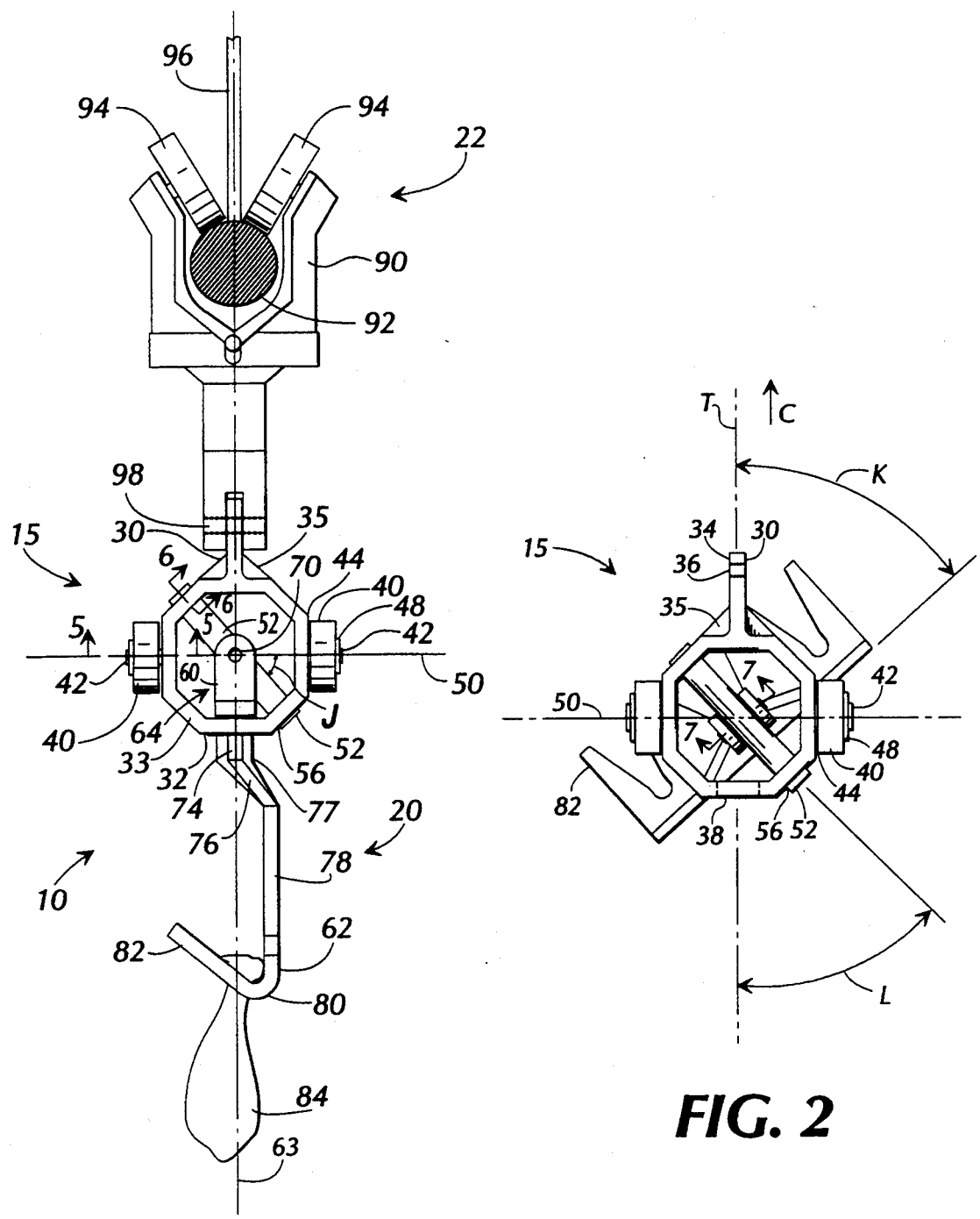
FIG. 1 is a front elevational view of a preferred embodiment of the grading shackle.
FIG. 2 is a top plan view of the grading shackle illustrated in FIG. 1, showing the bird support bracket in its rotated position when the support frame of the grading shackle has been tilted into a horizontal position.

Referring now in more detail to the drawings, in which like reference numerals indicate like parts throughout the several views, numeral 10 in FIG. 1 illustrates a preferred embodiment of the grading shackle of the present invention. Grading shackle 10 has two primary portions, a tiltable support frame 15, and a bird support bracket 20. Grading shackle 10, as illustrated in FIG. 1, is suspended from an overhead conveyor system 22 of a poultry processing plant in use.

As best shown in FIG. 1, tiltable support frame 15 has an upper end 30 and a lower end 32. Support frame 15 also has a wall section 33 which is octagonal in cross section and forms the body of the support frame. Upper end 30 has a tongue 34 for connecting grading shackle 10 to conveyor system 22. Tongue 34 has a rib section 35 for torsional rigidity, and a trolley connect opening 36 formed therein and passing therethrough for receiving pin 98 connecting trolley 90 to the grading shackle. Lower end 32 has a closed end slot 38 formed therein for receiving bird support bracket 20.

Figure 5:
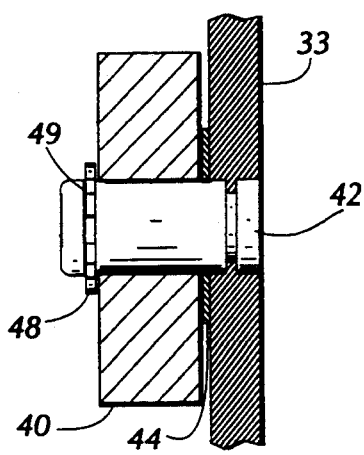
FIG. 5 is a cross sectional view of a support wheel attached to the support frame of the grading shackle illustrated in FIG. 1.

Referring now to FIGS. 1 and 2, support frame 15 also has a pair of opposed wheels 40 which rotate upon a pair of axial pins 42. Axial pins 42 are integrated into wall section 33 of support frame 15. This is best shown in FIG. 5, where it is shown that axial pin 42 has an annular section formed therein which is captured and held within wall section 33 of support frame 15 for fixably holding axial pin 42 in the support frame. Referring now to FIG. 5, wheel 40 is spaced apart from wall section 33 by a circular spacer 44 which is shaped as a circular washer with an annular opening passing therethrough, and is passed over axial pin 42 prior to placing wheel 40 on axial pin 42. Wheel 40 is held on axial pin 42 by a locking snap ring 48 which fits into an annular groove 49 formed in the periphery of axial pin 42. As illustrated in FIGS. 1 and 2, both of wheels 40 attached to support frame 15 are opposite hand versions of the other.

Referring now to FIGS. 1 and 2, it can be seen that wheels 40 lie along a common horizontal axis 50. As illustrated in FIG. 2, axis 50 is perpendicular, or transverse, to the axis of travel T along which grading shackle 10 is moved in the direction of arrow C.

Figure 6:
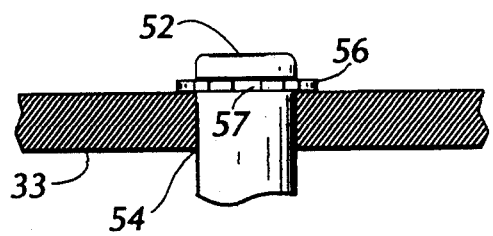
FIG. 6 is a cross sectional view illustrating the manner in which the elongated pin carried by the support frame is mounted to the grading shackle illustrated in FIG. 1.

As best shown in FIG. 1, support frame 15 also has an elongated pin 52 which is passed through an opposed pair of pin openings 54 (FIG. 3) so that pin 52 is rotatably supported by support frame 15. Referring now to FIGS. 1.2, and 6, elongated pin 52 is passed through two openings 54 (FIG. 6) on opposite sides of wall section 33, and is held in place by a locking snap ring 56 which is secured in annular slot 57 formed in the periphery of each end of elongated pin 52. As shown in FIG. 4 pin 52 is free to rotate in opening 54 as support frame 15 is tilted in the direction of arrow A away from the direction of arrow C as grading shackle 10 is moved along the axis of travel T of a poultry processing line. Pin 52 has an opening 52' (FIG. 7) defined therein and passing therethrough for receiving pin 70 for connecting bird support bracket 20 to tiltable support frame 15 of grading shackle 10, as discussed more fully below.

Figure 3:
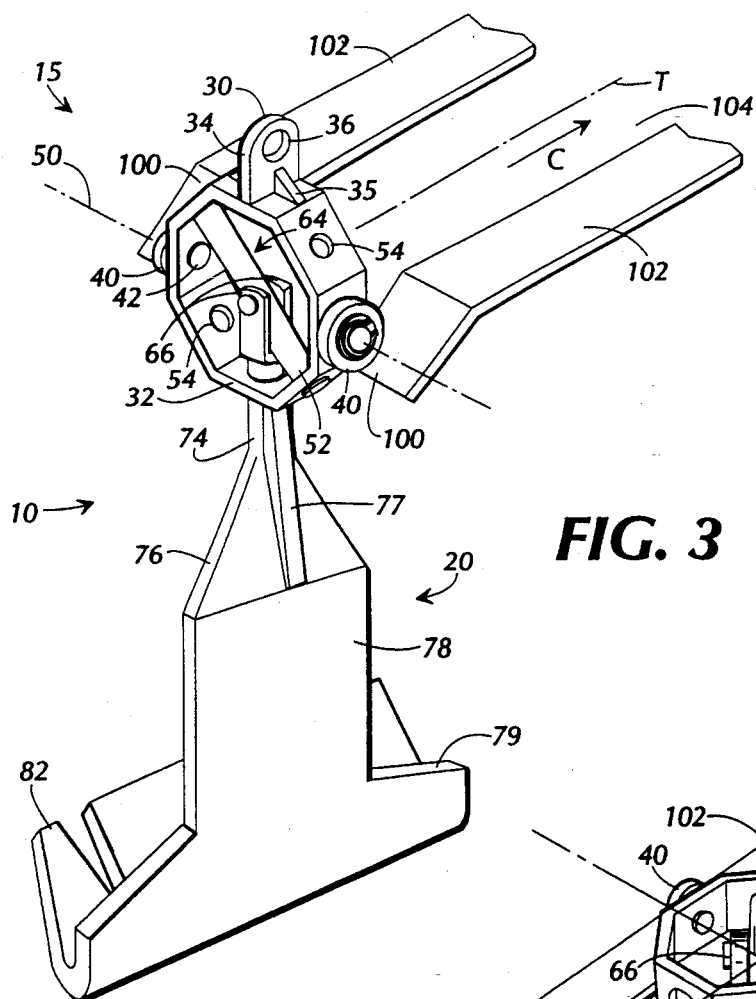
FIG. 3 is a perspective view of the grading shackle illustrated in FIG. 1 as it is carried on an overhead conveyor system toward the inclined ramps of a poultry processing line weigh scale.
Figure 4:
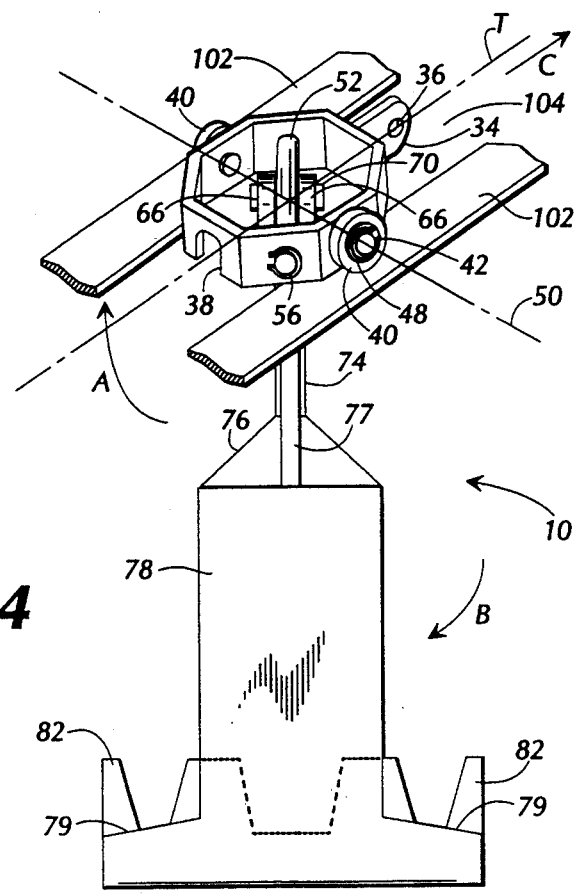
FIG. 4 is a perspective view of the grading shackle illustrated in FIG. 1 as it is carried along the weigh scale of a poultry processing line.

Bird support bracket 20 is illustrated in FIGS. 1, 3, and 4. Turning first to FIG. 1, bird support bracket 20 has a first end 60 and a second end 62. As grading shackle 10 is carried along a poultry processing line, bird support bracket 20 is oriented in an upright fashion along vertical axis 63. As illustrated in FIG. 1, vertical axis 63 passes through the center of the first end 60 of bird support bracket 20, as well as through the vertical center of tiltable support frame 15 and the vertical central axis of conveyor system 22, illustrated in cross section in FIG. 1.

Figure 7:
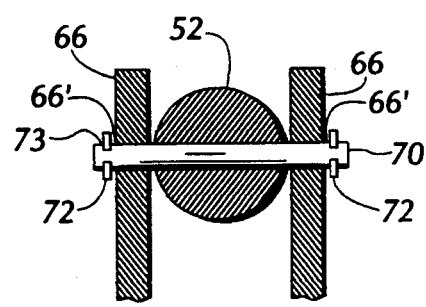
FIG. 7 is a cross sectional view illustrating the connection between the bird support bracket and the tiltable support frame of the grading shackle illustrated in FIG. 2.

As best shown in FIGS. 2 and 4, first end 60 of bracket 20 has a forked tongue 64 having a pair of opposed co-planar surfaces 66 which are spaced apart from one another with a breadth slightly larger than the breadth or diameter of elongated pin 52. As shown in FIG. 7, each one of co-planar surfaces 66 of tongue 64 has an opening 66' defined therein which is of the same circumference as opening 52' of elongated pin 52. Co-planar surfaces 66 are placed over elongated pin 52 so that openings 66' are aligned with opening 52', and a pin 70 is placed through each of co-planar surfaces 66 and pin 52 for pivotally connecting bird support bracket 20 to elongated pin 52 of tiltable support frame 15. Still referring to FIG. 7, pin 70 is held in position by a pair of locking snap rings 72 held in two annular slots 73 formed in the periphery of pin 70.

Accordingly, and as best shown in FIG. 4, as tiltable support frame 15 is tilted in the direction of arrow A, away from the direction of travel, shown by arrow C, elongated pin 52 of tiltable support frame 15 moves from a generally vertical orientation to a generally horizontal orientation while at the same time bird support bracket 20 remains in a vertical orientation. However, and as best shown in FIG. 2 and FIG. 4, while tiltable support frame 15 has been tilted in the direction of arrow A. bird support bracket 20 has been rotated as shown in the direction of arrow B (FIG. 4) due to the pivotal connection of tongue 64 to elongated pin 52. The function of elongated pin 52 and forked tongue 64 of bird support bracket 20 can best be likened to the functioning of a universal joint, for example.

As best shown in FIG. 1, elongated pin 52 is inclined at an angle J with reference to horizontal axis 50 of wheels 40. Angle J can be adjusted according to the degree of rotation sought for bird support bracket 20. Here, angle J is illustrated as being a 45° angle. By varying angle J, the angle of rotation K (FIG. 2) for bird support bracket 20 can also be varied so that the bird suspended from grading shackle 10 will rotate to the extent desired in order to clear adjacent birds on adjacent grading shackles 10. The preferred angle of rotation K is in the range between 30° to 60°.

Referring now to FIG. 2, once tillable support frame 15 has been moved from a vertical position to a horizontal position, elongated pin 52 is angled, away from the axis of travel T. This is shown by angle L in FIG. 2. Dependent upon angle J, angle L will equal angle J in that elongated pin 52 is ordinarily fixed in tillable support frame 15 of the grading shackle. Therefore, as tiltable support frame 15 is tilted into a horizontal position or attitude, not only will elongated pin 52 be at an angle J to horizontal axis 50 of wheels 40, elongated pin 52 will also be at an angle L to the axis of travel T.

Returning now to bird support bracket 20, FIGS. 1 and 4 illustrate that support bracket 20 has a first vertical section 74 which lies along vertical axis 63. First vertical section 74 then turns outward into first inclined section 76 which then forms a second vertical section 78 leading down to a second inclined section 79 (FIGS. 3, 4), and to an arcuate section 80 (FIG. 1). First vertical section 74 and first inclined section 76 share a rib 77, added to strengthen first end 60 of the bird support bracket. A forked section 82 is formed at the end of arcuate section 80, see FIGS. 2 and 4, for holding the legs 84 of a bird suspended from grading shackle 10. The knuckle portion of a bird leg is placed over the forks of forked section 82 which are sized and shaped to accommodate the particular type of bird being processed on the poultry processing line. For example, forked section 82 of grading shackle 10 would be sized smaller for chickens than it would be for turkeys which generally have a larger leg and hence larger knuckles and leg bones.

Referring now to FIG. 1, grading shackle 10 is suspended from an overhead conveyor system 22. Overhead conveyor system 22 will typically have a trolley 90 which rides on a trolley bar 92. Trolley 90 is supported on trolley bar 92 by a plurality wheels 94 which will rotate freely in the direction of travel for trolley 90. Trolley bar 92 will be suspended from the ceiling or support structures (not illustrated) of the poultry processing line by a trolley bar support 96. Trolley 90 is moved along the poultry processing line by a continuous chain drive (not illustrated) which moves each trolley 90 along the processing line. Trolley 90 is connected to tiltable support frame 15 by a pin 98 passed through trolley connect opening 36 of support frame's 15 tongue 34.

With the exception of axial pins 42, spacers 44, locking snap rings 48, elongated pin 52, and locking snap rings 56 of tiltable support frame 15, and pin 70 and locking snap rings 72 of bird support bracket 20, all of the components of grading shackle 10 are constructed of a commercial grade plastic such as nylon, delrin, polyethylene, or other similar plastics which have been approved by the United States Department of Agriculture for use in poultry processing operations. These plastics will typically be impermeable to solutions, will be rigid and durable, and will be capable of being cleaned and sanitized during the cleaning and sanitization of the poultry processing line. Axial pins 42, spacers 44, snap rings 48, elongated pin 52, snap rings 56, pin 70, and snap ring 72 will he constructed of stainless steel or any other metallic material approved for use in poultry processing plants. The stainless steel used to fabricate these parts will typically be polished so that it has a smooth surface which can be readily cleaned. Also, it is important that the surfaces of axial pins 42, elongated pin 52, and pin 70 connecting bird support bracket 20 to tiltable support frame 15 be polished so that the pins will permit the wheels and bird support bracket, respectively, to rotate smoothly without any binding in the operation of the grading shackle.

OPERATION

The method of operating grading shackle 10 is best shown in FIGS. 3 and 4. Referring first to FIG. 3, grading shackle 10 is shown in its normal orientation along a poultry processing line as it is being moved toward the weigh scale or load bridge of the poultry processing line. The weigh scale (not illustrated) will typically have a pair of inclined ramps 100 leading to a pair of parallel spaced apart rails 102 which are separated at a distance approximately equal to the distance between each of wheels 40 on tiltable support frame 15. Still referring to FIG. 3, an elongated, open-ended, and slotted opening 104 is formed in the space between each of rails 102. The axis of travel T also serves as the longitudinal axis for opening 104 along rails 102 of the poultry processing line (not illustrated). Grading shackle 10 is moved in the direction of arrow C along the poultry processing line toward, and ultimately on, inclined ramps 100 and rails 102 of the weigh scale.

As the grading shackle 10 approaches the weigh scale, bird support bracket 20, and in particular second vertical section 78 and forked section 82, lie in a vertical plane parallel to and offset from the axis of travel T along the poultry processing line. As discussed above, as grading shackle 10 approaches the weigh scale each of wheels 40 lies along a common horizontal axis 50 which is perpendicular to the direction of travel C of grading shackle 10 along the processing line. Elongated pin 52 is also oriented along horizontal axis 50 of wheels 40 so that it is transverse or perpendicular, to the direction of travel C as grading shackle 10 moves toward the weigh scale. As shown in FIG. 3, elongated pin 52 is in a generally upright or vertical position prior to tilting tiltable support frame 15 on the weigh scale.

Referring now to FIG. 4, grading shackle 10 is shown after it has proceeded up inclined ramps 100 and is now supported on rails 102 of the weigh scale. As grading shackle 10 moved up inclined ramps 100, tiltable support frame 15 was tilted away from rails 102 as shown in the direction of arrow A. This occurs because tongue 34 of tiltable support frame 15 is connected to trolley 90 of the overhead conveyor system (FIG. 1). The trolley will continue to move forward at a steady rate of speed while the tiltable support frame 15 will be lifted up toward the conveyor system as wheels 40 travel upward on inclined ramps 100 of the weigh scale. In order to accommodate the tilting of the support frame 15, tongue 34 will pivot about trolley connect opening 36. For the sake of clarity, the connection between tiltable support frame 15 and trolley 90 has not been shown in FIGS. 3 and 4, in order to completely illustrate the orientation of tiltable support frame 15, and the rotation of bird support bracket 20, on the weigh scale.

Once tiltable support frame 15 has been received on inclined ramps 100 and begins to travel up the ramps, tiltable support frame 15 will transition from a generally vertical attitude to a generally horizontal attitude as illustrated in FIGS. 3 and 4. As tiltable support frame 15 moves from a vertical to horizontal attitude, bird support bracket 20 remains in a vertical orientation with respect to tiltable support frame 15. Bird support bracket 20 is accommodated by tiltable support frame 15 through elongated slotted opening 38 formed in the lower end 32 of the tiltable support frame so that the first end 60 of bird support bracket 20 will lie along vertical axis 63 through tiltable support frame 15. This is best shown in FIG. 4.

As tiltable support frame 15 proceeds up inclined ramps 100 onto rails 102, elongated pin 52 and tiltable support frame 15 rotate from a upright or vertical position into a generally horizontal attitude. As elongated pin 52 tilts in the direction of arrow A, forked tongue 64 of bird support bracket 20, which is pivotally connected to pin 52 by pin 70, will be rotated through angle K (shown in FIG. 2) in the direction of rotation shown by arrow B in FIG. 4. This rotation occurs because each of co-planar surfaces 66 of forked tongtie 64 (illustrated in FIG. 7) will be rotated through angle L shown in FIG. 2. The resulting rotation of bird support bracket 20 through angle L results in the rotation of the second end 62 of bird support bracket 20 through angle K, also illustrated in FIG. 2. By rotating bird support bracket 20 through angle K, the wingtips of bird 84 held on bird support bracket 20 will also rotate through angle K, and thus clear the wingtips of adjacent birds suspended from grading shackles located on both sides of the bird 84.

Once tiltable support frame 15 has been moved into a generally horizontal position, it will travel along rails 102 of the weigh scale through elongated slotted opening 104. During the time grading shackle 10 is riding on rails 102, the weigh scale is weighing both the grading shackle 10 and the bird 84 suspended from the shackle. Since the weight of the grading shackle is known, it will be automatically subtracted by a computing device so that the net weight of the bird 84 being carried on grading shackle 10 will be known. With this information, bird 84 can be directed toward the cut-up line sized to accommodate birds of that weight range.

After bird 84 has been weighed, grading shackle 10 will proceed along rails 102 of the weigh scale in the direction of travel shown by arrow C. As grading shackle 10 approaches the end of rails 102, the rails will fall away (not illustrated) so that wheels 40 will begin to lower the lower end 32 of tiltable support frame 15 toward the axis of travel T in the direction of travel C, and tiltable support frame 15 will move from a generally horizontal to a generally vertical position while the grading shackle 10 is being carried on the overhead conveyor system 22. As tiltable support frame 15 is being tilted upward, elongated pin 52 is again rotating through angle L, however this time in reverse, so that bird support bracket 20 is rotated in a direction opposite to the direction of arrow B shown in FIG. 4, so that bird support bracket 20 ends up in its original orientation in relation to tiltable support frame 15, as best shown in FIG. 1. Thereafter, the grading shackle passes along the poultry processing line until it reaches a transfer machine for transferring bird 84 to a cut-up line, where the bird is automatically or manually removed from the weigh line of the poultry processing system.

Thus, it can be seen that the present invention comprises a useful and effective apparatus and method for conveying poultry toward and on a weigh scale of an automated poultry processing line for accurately determining the weight of the bird suspended from the grading shackle. While the invention has been shown and described as what is presently believed to be the most practical and preferred embodiment thereof, it will be apparent that modifications and variations within the scope and spirit of the disclosed invention are possible, and that the invention is to be afforded the interpretation so as to encompass all of the equivalent thereof, as set forth in the following claims.

We claim:

1. An angularly displaceable grading shackle for carrying poultry to be weighed as the shackle moves along an overhead conveyor system of a poultry processing line in a poultry processing plant, said grading shackle comprising:
   a tiltable support frame for suspension from an overhead conveyor system, said support frame including means for tilting said support frame in response to the movement of said shackle along an inclined portion of the processing line;
   bird support means suspended from said support frame;
   said tiltable support frame and said bird support means including means responsive to the tilting of said support frame for rotating said bird support means about a generally upright axis.

2. The grading shackle of claim 1, wherein said means for tilting said support frame comprises means for pivotally connecting said support frame to said overhead conveyor and a pair of parallel spaced apart wheels, each of said wheels being connected to said frame along a common generally horizontal axis transverse to the direction of travel of said shackle for movement along a pair of parallel rails supporting said wheels as said shackle travels along a portion of the poultry processing line.

3. The shackle of claim 2, wherein said tiltable support frame has an upper and a lower end, said upper end being sized and shaped to be carried by the overhead conveyor system along a poultry processing line.

4. The shackle of claim 3, wherein said upper end of said tiltable support frame is sized and shaped to pivot about a point as said wheels travel along an inclined portion of the mils of the processing line for tilting said frame away from the direction of travel of the shackle along the rails as said wheels engage the rails.

5. The shackle of claim 3, wherein said means responsive to the tilting of said support frame comprises an elongated pin supported in said frame, and where said pin is carried in said frame in a generally vertical plane at an upwards facing angle away from said axis of said wheels, and when said frame is tilted toward a generally horizontal attitude said pin is carried in said frame and at an angle with respect to the direction of travel, whereby said bird support means will rotate about said upright axis.

6. The shackle of claim 1, wherein said bird support means has a first end and a second end, and wherein said first end is pivotally connected to said support frame, and where said second end is sized and shaped to carry poultry suspended by its legs.

7. A poultry support shackle for transporting birds along the overhead conveyor system of poultry processing line toward a weigh scale for weighing the birds, the birds being supported in closely spaced relationship so that the wings of adjacent birds are likely to engage each other, said shackle comprising:
   a support frame for connection to the overhead conveyor system, said support frame including means for tilting said support means in response to the movement of said shackle along an inclined portion of the processing line;
   bird support means suspended from said support frame;
   said support frame including means for rotating said bird support means through an arc about a generally upright axis sufficient to clear the wings of birds suspended from adjacent shackles when said shackle is being weighed in response to the tilting of said support frame.

8. The shackle of claim 7, wherein said means for tilting said frame comprises:
   means for pivotally connecting said support frame to said overhead conveyor and a pair of parallel spaced apart support wheels rotatably mounted on opposite sides of said frame along a common generally horizontal axis perpendicular to said shackle's direction of travel along the poultry processing line for carrying said frame along the inclined portion of the poultry processing line; and said means for rotating said bird support includes
   an elongated pin rotatably supported within said frame, wherein said pin is disposed at an angle with respect to the axis of said wheels, and where said pin lies in a generally upright plane when said wheels are not supported on the rails of the overhead conveyor system and where said pin tilts toward a generally horizontal plane and is oriented at an angle from the direction in which said shackle is traveling when said frame is tilted.

9. The shackle of claim 8, wherein said bird support means comprise a bracket having first and second ends, said first end being pivotally connected to said pin intermediate its ends, and said second end being sized and shaped to carry poultry suspended by its legs.

10. The shackle of claim 9, wherein said frame has a slotted opening defined in its bottom end for removably receiving said first end of said bird support means when said support frame is being carried in an upright orientation along the overhead conveyor system of the poultry processing line.

11. The shackle of claim 10, wherein said bird support means is oriented to lie in an upright plane parallel to the direction of travel of said support means when said frame is not being tilted.

12. The shackle of claim 10, wherein said shackle comprises means for rotating the bird support means through an arc of between 30° and 60° about a generally upright axis in response to tilting said support, whereby the wings of the bird suspended from said bracket will move away from engagement with the wings of any adjacent birds on adjacent shackles as said shackle is being weighed.

13. A method for conveying poultry carcasses suspended from the overhead conveyor system of a poultry processing line in a poultry processing plant toward and upon a weigh scale or similar device used to weigh the poultry, comprising the steps of:
   tilting a shackle from which each carcass is suspended in response to proceeding up an inclined ramp toward the weigh scale of the processing line; and
   rotating said shackle about a generally upright axis in response to the tilting of said shackle.

14. The method of claim 13, and further comprising the steps of conveying said shackle on the weigh scale so that said shackle is supported by the weigh scale, and tilting said shackle away from the direction of travel as said shackle is supported on the weigh scale.

15. The method of claim 14, and further comprising the step of raising said shackle to a generally upright position as said shackle is conveyed off of the weigh scale.

16. The method of claim 15, and further comprising the step of rotating said shackle back into its original position as said shackle is tilted upwards into a generally upright position.

17. A method for conveying poultry suspended from the overhead conveyor system of a poultry processing line in a poultry processing plant toward and upon a weigh scale or similar device used to grade the poultry carcasses, comprising the steps of:
- tilting a portion of the shackle in response to the shackle moving along an inclined portion of the processing line;
- in response to tilting the portion of the shackle, rotating the bird carried by the shackle about an approximately upright axis.

18. The method of claim 19, further comprising the steps of conveying said shackle on a weigh scale so that said shackle is supported by the weigh scale, and the tilting portion of said shackle away from the direction of travel as said shackle is conveyed on the weigh scale.

19. The method of claim 18, further comprising the step of raising the tilted portion of said shackle to a generally upright position as said shackle is conveyed off of the weigh scale.

20. The method of claim 19, further comprising the step of rotating the bird carried by the shackle back into its original position as the tiltable portion of said shackle is tilted back to its upright position.

21. The method of claim 17, wherein the step of tilting the portion of said shackle comprises the step of tilting the shackle into a generally horizontal attitude as said shackle is conveyed along the weigh scale.

22. The method of claim 17, wherein the step of rotating the bird carried by the shackle comprises the step of rotating the bird through an arc of between 30° and 60° from the bird's original position in response to tilting said shackle.

23. The method of claim 17, wherein the step of tilting said shackle comprises:
- conveying said shackle toward the weigh scale, the weigh scale having a pair of inclined ramps for receiving said shackle;
- engaging said shackle having a tiltable support frame upon the inclined ramps of the weigh scale so that said support frame is moved upwardly in relation to the overhead conveyor system of the poultry processing line;
- tilting said tiltable support frame into a generally horizontally position while said tiltable support frame is conveyed upon the rails of the weigh scale; and
- tilting said tiltable support frame back into a generally upright position as said shackle is conveyed off of the weigh scale.

24. The method of claim 17, further comprising the steps of:
- tilting said tiltable support frame away from the direction of travel as said support frame is moved toward the weigh scale; and
- simultaneously rotating the bird carried by the shackle through an arc about a generally upright axis as said tiltable support means is tilted.

* * * * *